United States Patent
Kandasamy et al.

(10) Patent No.: US 11,057,842 B2
(45) Date of Patent: Jul. 6, 2021

(54) INTERFERENCE AWARE TRANSMISSION POWER CONTROL METHOD AND DEVICE FOR IEEE 802.11 BASED WIRELESS NETWORK WITH NODES HAVING A DIRECTIONAL ANTENNA

(71) Applicant: INESC TEC—INSTITUTO DE ENGENHARIA DE SISTEMAS E COMPUTADORES, TECNOLOGIA E CIÊNCIA, Oporto (PT)

(72) Inventors: Saravanan Kandasamy, Oporto (PT); Manuel Alberto Pereira Ricardo, Oporto (PT)

(73) Assignee: INESC TEC—INSTITUTO DE ENGENHARIA DE SISTEMAS E, Oporto (PT)

( * ) Notice: Subject to any disclaimer, the term of this patent is extended or adjusted under 35 U.S.C. 154(b) by 0 days.

(21) Appl. No.: 16/757,242

(22) PCT Filed: Oct. 18, 2018

(86) PCT No.: PCT/IB2018/058104
§ 371 (c)(1),
(2) Date: Apr. 17, 2020

(87) PCT Pub. No.: WO2019/077550
PCT Pub. Date: Apr. 25, 2019

(65) Prior Publication Data
US 2020/0389854 A1 Dec. 10, 2020

(30) Foreign Application Priority Data

Oct. 18, 2017 (PT) .......................................... 110355
Nov. 8, 2017 (EP) ..................................... 17200699

(51) Int. Cl.
*H04W 52/24* (2009.01)
*H04W 52/36* (2009.01)
(Continued)

(52) U.S. Cl.
CPC ......... *H04W 52/243* (2013.01); *H04W 16/28* (2013.01); *H04W 52/367* (2013.01); *H04W 52/42* (2013.01)

(58) Field of Classification Search
CPC . H04W 52/244; H04W 52/42; H04W 52/243; H04W 16/28
(Continued)

(56) References Cited

U.S. PATENT DOCUMENTS

2011/0164514 A1    7/2011  Afkhamie et al.
2015/0016359 A1*   1/2015  Wang ................... H04L 5/0053
                                                              370/329

(Continued)

OTHER PUBLICATIONS

N. Li; P. Guo; J. Zhao: "IACT-MAC: A New Interference Avoidance and Parallel Transmission MAC Protocol", Journal of Applied Science and Engineering, vol. 18, No. 2, 2015, pp. 129-134.
(Continued)

*Primary Examiner* — John J Lee
(74) *Attorney, Agent, or Firm* — Leason Ellis LLP

(57) ABSTRACT

The present disclosure relates to a transmission power control method and device capable of dynamically selecting optimal transmission power for the nodes in wireless network considering its surrounding interference. An embodiment comprises calculating a reduced transmitted power which will cause a corresponding reduced received power, such that: (a) transmitter interface and receiver interface can maintain connectivity of the active link with the reduced transmitted power, in the antenna direction between transmitter interface and receiver interface; (b) the reduced transmitted power does not create additional link-interfer-
(Continued)

ence edges from any other active link, even if the transmission power of the other active link is maintained, in the antenna direction between the transmitting interface of the other active link and the receiver interface; and (c) the reduced transmitted power does not create additional hidden nodes, such that a CSRange of the reduced transmission power is still sufficient to inhibit transmission by any other interfering network node interface, in the antenna direction between said any other interfering network node and the receiver interface.

15 Claims, 7 Drawing Sheets

(51) Int. Cl.
   *H04W 16/28* (2009.01)
   *H04W 52/42* (2009.01)
(58) Field of Classification Search
   USPC .................. 455/522, 69, 501, 67.16, 67.11
   See application file for complete search history.

(56) References Cited

U.S. PATENT DOCUMENTS

| | | | | |
|---|---|---|---|---|
| 2015/0127733 A1* | 5/2015 | Ding | ..................... | H04W 8/005 709/204 |
| 2016/0029305 A1* | 1/2016 | Kim | .................. | H04W 72/0473 370/311 |
| 2018/0027507 A1* | 1/2018 | Hojeij | ................. | H04W 52/346 455/522 |

OTHER PUBLICATIONS

Y. Li; M. Li; W. Shu; M.-Y. Wu: "FFT-DMAC: A Tone Based MAC Protocol with Directional Antennas", IEEE Global Telecommunications Conference (GLOBECOM '07, 2017, pp. 3661-3665.

Y.-C. Tsai; S.-L. Su: "An SINR-based Routing and MAC Design for QOS in Wireless Ad Hoc Networks", Journal of Wireless Network, vol. 21, No. 4, 2015, pp. 1141-1154.

Li Bin Jiang et al, "Hidden-Node Removal and Its Application in Cellular WiFi Networks", IEEE Transactions on Vehicular Technology, IEEE Service Center, Piscataway, NJ, US, (Sep. 1, 2007), vol. 56, No. 5, ISSN 0018-9545, pp. 2641-2654.

Kandasamy Saravanan et al, "Call admission control for wireless mesh network based on power interference modeling using directional antenna", Wireless Networks, ACM, 2 Penn Plaza, Suite 701—New York USA, vol. 22, No. 7, ISSN 1022-0038, (Oct. 23, 2015), pp. 2299-2316.

Kandasamy Saravanan et al, "Power interference modeling for CSMA/CA based networks using directional antenna", Computer Communications, Elsevier Science Publishers BV, Amsterdam, NL, (Feb. 9, 2016), vol. 86, pp. 86-98.

W-H Ho I et al, "Impact of Power Control on Performance of IEEE 802.11 Wireless Networks", IEEE Transactions on Mobile Computing, IEEE Service Center, Los Alamitos, CA, US, (Nov. 1, 2007), vol. 6, No. 11, ISSN 1536-1233, pp. 1245-1258.

C. Balanis: "Antenna Theory: Analysis and Design", 2012, Third Edition US20110164514A1WILEY Interscience, p. 1-1072.

\* cited by examiner (a) Omnidirectional Antenna (b) Directional Antenna (a) Omnidirectional Antenna (b) Directional Antenna

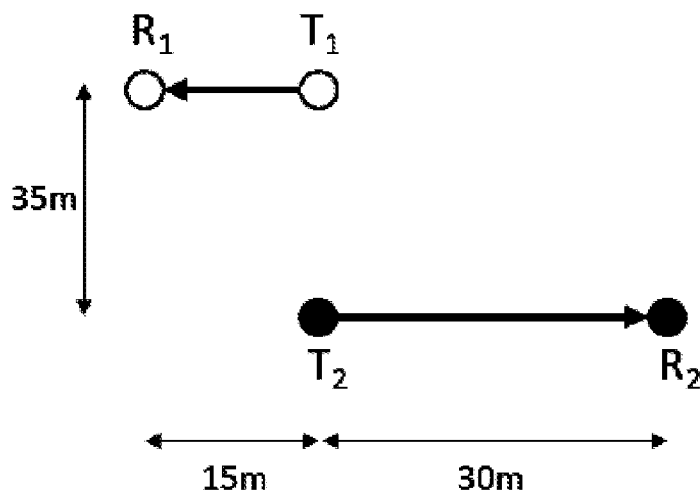

Fig. 8

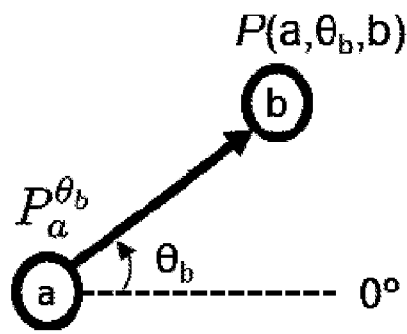

Fig. 9

```
sssit@JavaTpoint:~$ iwconfig
lo        no wireless extensions.

wlan0     IEEE 802.11bgn  ESSID:"NETGEAR64"
          Mode:Managed  Frequency:2.452 GHz  Access Point: C0:FF:D4:91:49:DF
          Bit Rate=57.8 Mb/s   Tx-Power=20 dBm
          Retry long limit:7   RTS thr:off   Fragment thr:off
          Power Management:on
          Link Quality=47/70  Signal level=-63 dBm
          Rx invalid nwid:0  Rx invalid crypt:0  Rx invalid frag:0
          Tx excessive retries:0  Invalid misc:8   Missed beacon:0 eth0      no wireless extensions.

sssit@JavaTpoint:~$
```

Fig. 10

INTERFERENCE AWARE TRANSMISSION POWER CONTROL METHOD AND DEVICE FOR IEEE 802.11 BASED WIRELESS NETWORK WITH NODES HAVING A DIRECTIONAL ANTENNA

CROSS-REFERENCE TO RELATED APPLICATIONS

This application is a U.S. National Stage Application under 35 U.S.C. § 371 of International Patent Application No. PCT/IB2018/058104, filed Oct. 18, 2018, which claims priority to European Patent Application No. 17200699.1, filed Nov. 8, 2017, and Portugal Patent Application No. 110355, filed Oct. 18, 2017, the contents of which are each hereby incorporated by reference in their respective entireties.

TECHNICAL FIELD

The present disclosure relates to a transmission power control method and device capable of dynamically selecting optimal transmission power for the nodes in wireless network considering its surrounding interference.

BACKGROUND

The proliferation of cheap wireless devices and the fast growth of the Internet has led to an explosion of IEEE 802.11 based wireless networks widely deployed around the globe in corporate buildings, universities, urban cities, and residential areas. It provides wireless Internet facilities consisting of Access Points (APs) to users using mobile phones, laptops and to other devices such as wrist bands, digital cameras, home appliances, or industrial equipment, also referred as stations (STAB).

However, as the wireless networks become larger and denser due to the accumulation of nodes, capacity problem arises due to the inherent broadcast nature of the wireless medium and limited unlicensed spectrum availability at any given time. This degrades the performance of the wireless networks. As wireless networks can be deployed without a license and large number of APs are needed to cover a large geographical area, lack of planning causes the network to saturate and to reach its capacity faster. Installing additional APs does not increase the capacity of the network beyond a certain limit. In some cases, additional APs may contribute to the degradation of the aggregated network throughput and increase in delay as more interference is introduced in the network.

Interference is the disturbance caused by a node's radio frequency (RF) transmission into neighbouring node(s). Interference may have several effects to the node that is not meant to receive the signal such as: a) a node intending to transmit a packet is not able to transmit the packet—exposed node (EN) problem; b) a node which should be receiving a packet meant for it is not able to receive the packet—hidden node (HN) problem; and c) a node needs to unnecessarily spend its energy to decode the incoming signal which is not meant for it. High transmission powers increase the number of nodes being interfered.

In such cases, reducing the transmission power of the nodes is a common approach. The minimal transmission power is one of the popular transmission power control approaches where the transmission powers of participating nodes are reduced so that it is sufficient for the transmitted packets to be decoded by its destination nodes. This strategy may be detrimental in some cases as reducing a transmission power without considering its surrounding interference increases the probability of collision due to lower signal to noise ratio (SNR). Hence, one must consider not just the power requirement of a link in terms of its SNR, i.e. the minimum power required at the receiver so that the signal is sufficiently above the noise floor to decode a packet, but also its signal to interference ratio (SIR) with respect to the potential interferences with the surrounding links.

These facts are disclosed in order to illustrate the technical problem addressed by the present disclosure.

GENERAL DESCRIPTION

The present disclosure relates to a transmission power control system capable of dynamically selecting optimal transmission power for the nodes in wireless network considering its surrounding interference.

The disclosure is suitable to be used in the software defined networking (SDN) paradigm and as a network planning software that can assist to achieve a maximum gain of 80% of throughput in some scenarios and can be easily adapted to commercial systems. An example to configure the transmission power for an IEEE 802.11 device is demonstrated.

The operation mode of a transmission power control (TPC) algorithm, centralized or distributed, determines the complexity of its implementation. There are many works [1-4], have modelled TPC in a distributed approach. Distributed TPCs may require additional control or Hello packets to be sent frequently in the network, existing frame format to be modified to piggy back additional information, separate channel, redesigning the network interface cards and constant measurement of wireless medium to facilitate the operation of the TPC algorithm. This may not be attractive as not being retrospect with the legacy IEEE 802.11 devices which already been deployed, plus it reduces the capacity of the network due to additional control packets and demands changes to the existing operation of the IEEE 802.11 Medium Access Control (MAC) protocol. We modelled the disclosed TPC using a centralized approach that does not require hardware changes and maintains compatibility with the existing/legacy IEEE 802.11 devices. This presently disclosed method is suitable to be used: a) in the software defined networking (SDN paradigm) if it is placed in the cloud server which receives/sends control messages; b) as a network planning software where the method suggests the optimal power either for a network or node or interface should use in order for the network to perform optimally.

An interference-aware TPC solution has been proposed by S. C. Liew [3]. This Decoupled Adaptive Power Control (DAPC) algorithm that when adjusting powers, makes sure that no new interference relationships are created beyond those already in existence in network and no new HN is created. The DAPC achieves high spectral reuse by reducing EN while avoiding HN entirely. Using this approach, DAPC can improve the network capacity of non-power controlled IEEE 802.11 by more than two times. Although the results of DAPC algorithm for wireless network with nodes using omnidirectional antennas (OA) is promising, this approach is not suitable for wireless network with nodes using directional antenna (DA). In detail, DAPC: 1) did not consider a node's direction of transmission θ. 2) considered the Physical Carrier Sensing Range (PCSRange) when modelling the concept of Interference Range. PCSRange refers to the physical carrier sensing ranges by the transmission of DATA packets [2]. For the correct operation of the physical layer, the disclosed interference-aware transmission power control, herewith IA-TPC, has considered the carrier sensing range (CSRange) which is limited by the carrier sensing range of any packets sent over a wireless channel. This is because all packets, not limiting to DATA packets, enable carrier sense functionality at the receiving interface. Plus, in order to be complete, we considered the constraints contributed by the ACK packets in Property 3 of the IA-TPC method.

In [5], a Call Admission Control (CAC) mechanism was proposed that makes decisions based on interference information for IEEE 802.11 based wireless mesh network (WMN) consisting of nodes using DA to address the problem of providing a minimal Quality of Service (QoS) to traffic flows without the need of hardware changes to legacy IEEE 802.11 networks. The CAC has two main characteristics: (a) it manages requests from users depending on the available bandwidth in the network; (b) it controls the interference in the WMN whenever a new user is admitted into the network by controlling the transmission power of all the participating nodes using Property 1 and Property 2 of [3]. The objective of the TPC algorithm in [5] is to yield more feasible traffic flow connections while maintaining a minimal QoS for the WMN allowing a WMN operator to increase his revenue by using this CAC. The main limitations of this method were the creation of additional HN problems in the wireless network and throughput improvements in relation with interference were not studied. A property with a novel constraint for ACK in IA-TPC is proposed to ensure HN problem is not exacerbated by allowing the carrier sensing mechanism inherent to IEEE 802.11 protocol to cover the interfering nodes. The TPC algorithm in [5] is only able to control power by interface while the presently disclosed IA-TPC method and system has 3 degrees of freedom where it is able to control power by network, node and interface.

A system and method for a transmission power control for IEEE 802.11 based wireless network with nodes using DA is shown. The system improves the throughput performance of IEEE 802.11 based wireless networks with nodes using DAs by judiciously reducing the network's interference. The disclosed method, IA-TPC, is backward compatible as it can also be used in networks with nodes using OA. In IA-TPC, a node considering to adjust its transmission power needs to collect information from neighbouring nodes that are within a particular distance and adjusts its power via a number of iterations. The disclosed method uses a convergence test (see FIG. 6)—though the Y-axis here does not represent Transmission Power, the same applies for example, when the transmission power of the nodes in the network are not able to be reduced further, the iteration may be stopped. The method considers these properties when controlling the transmission power: 1) the transmitter and receiver nodes can maintain its link connectivity; 2) no new link-interference edges are created from other active links to itself during the transmission power reduction process, even if the transmission powers of other active links are not reduced; and 3) no new hidden nodes are created, and the CSRange of the reduced transmission power is still sufficient to cover the interfering nodes. The method is suitable to be used: a) in the SDN paradigm if it is placed in the cloud server which receives or sends control messages; b) as a network planning software where the method suggests the optimal power either for a network or node or interface should use in order for the network to perform optimally.

It is disclosed an interference aware transmission power control method for wireless network nodes, comprised in a network having pair-wise active links, each having one or more directional antennas, comprising the steps of,
  for an individual node, for each active link of said individual node, said active link thus having a transmitter node and a receiver node,
  calculating a reduced transmitted power which will cause a corresponding reduced received power, such that:
  (a) transmitter node and receiver node can maintain connectivity of the active link with the reduced transmitted power, in the antenna direction between transmitter node and receiver nodes;
  (b) the reduced transmitted power does not create additional link-interference edges from any other active link, even if the transmission power of the other active link is maintained, in the antenna direction between the transmitting interface of the other active link and the receiver node; and
  (c) the reduced transmitted power does not create additional hidden nodes, such that a CSRange of the reduced transmission power is still sufficient to inhibit transmission by any other interfering network node, in the antenna direction between said any other interfering network node and the receiver node.

The present disclosure may also be applied to multiple interfaces of a same node.

It is disclosed an interference aware transmission power control method for wireless network nodes, comprised in a network having pair-wise active links, each having one or more directional antennas, comprising the steps of,
  for an individual node, for each active link of said individual node, said active link thus having a transmitter interface and a receiver interface,
  calculating a reduced transmitted power which will cause a corresponding reduced received power, such that:
  (a) transmitter interface and receiver interface can maintain connectivity of the active link with the reduced transmitted power, in the antenna direction between transmitter interface and receiver interface;
  (b) the reduced transmitted power does not create additional link-interference edges from any other active link, even if the transmission power of the other active link is maintained, in the antenna direction between the transmitting interface of the other active link and the receiver interface; and
  (c) the reduced transmitted power does not create additional hidden nodes, such that a CSRange of the reduced transmission power is still sufficient to inhibit transmission by any other interfering network node, in the antenna direction between said any other interfering network node interface and the receiver interface.

In an embodiment, (a) comprises calculating a reduced transmitted power, such that the reduced received power at the receiver, in the direction of transmission between transmitter and receiver of the active link, will be above the minimum received power threshold required to maintain connectivity of the active link;

In an embodiment, (b) comprises calculating a reduced transmitted power, such that the reduced received power at the receiver will be above the minimum received power threshold required to avoid interference from any other network node other than the transmitter and receiver interfaces of the active link, in the direction of transmission between the other network node and the receiver interface.

In an embodiment, the other network node is limited to the network nodes that have a power received at the receiver from the other network node, in the direction of transmission between the other network node and the receiver interface, above a received signal strength threshold required to decode a packet.

In an embodiment, (c) comprises calculating a reduced transmitted power, such that for any other network node that has a link-interference edge to the active link, the reduced received power at the other network node will be above a minimum received power threshold required to inhibit the other network node interface from transmitting, when using a Carrier Sense Range, CSRange.

In an embodiment, Carrier Sense Range, CSRange, is defined by a Carrier Sense Threshold, $CS_{th}$, such that if the received energy in a wireless channel is above $CS_{th}$, the channel is considered busy and transmission is inhibited (see for reference, section 10.3.2.1 of IEEE Standard for Information Technology—Telecommunications and Information Exchange between Systems: Local and Metropolitan Area Networks—Speci c Requirements. Part 11: Wireless LAN Medium Access Control (MAC) and Physical Layer (PHY) Specifications, 2016, IEEE 802.11™-2016).

In an aspect of the disclosure, Carrier Sense Range, CSRange, is applied to any packet sent over the wireless channel, thus not limited to data packets.

Carrier-sense range (CSRange) is the distance from a transmitter up to which other nodes assess the channel as busy based on the received energy from said transmitter. This can be understood as a theoretical distance beyond which two transmitters choose to ignore each other. This is related to the carrier sense threshold, $CS_{th}$, which is the signal detection threshold, of the received energy in the channel, above which a node assessing the channel will assume that the channel is busy, and defer transmission.

In an aspect of the disclosure, Carrier sense (CS) refers the ability of the receiver to detect an incoming Wi-Fi signal packet, independently of the packet being a data packet or not.

An embodiment comprises applying said steps iteratively, until an optimum is obtained where the transmission power of the network or node or interface is no longer able to be further reduced.

An embodiment comprises applying said steps wherein the calculated reduced transmitted power is such that all interfaces of all wireless network nodes have the same transmission power.

An embodiment comprises applying said steps wherein the calculated reduced transmitted power is such that all interfaces of each wireless network node have the same transmission power.

An embodiment comprises applying said steps wherein the calculated reduced transmitted power is such that all interfaces of all wireless network nodes have an independent transmission power.

It is also disclosed a distributed interference aware transmission power control method for wireless network nodes, further comprising the step of the network nodes broadcasting power information exchange packets periodically to exchange power information with neighbour network nodes.

The embodiments of the disclosed method may be used for configuring a software-defined network, for planning a wireless network, or for distributed interference aware transmission power control.

In an embodiment, the wireless network is a IEEE 802.11 wireless network or alternatively a wireless network compatible with the present disclosure.

It is also disclosed a device comprising a data processor and data memory, said memory comprising program instructions for implementing an interference aware transmission power control method for wireless network nodes having a directional antenna, the program instructions including instructions executable to carry out any of the disclosed methods.

In an embodiment, the directional antenna is a switched beam antenna, a steerable beam antenna, an adaptive array antenna or several passive directional antennas connected via a plurality of interfaces.

It is also disclosed a non-transitory storage media including program instructions for implementing an interference aware transmission power control method for wireless network nodes having a directional antenna, the program instructions including instructions executable to carry out carry out any of the disclosed methods.

BRIEF DESCRIPTION OF THE DRAWINGS

The following figures provide preferred embodiments for illustrating the description and should not be seen as limiting the scope of invention.

FIG. 8 is a diagram showing an example of scenario illustrating the shortcoming of minimal transmit power approach.

FIG. 9 is a diagram showing the transmission power notation used for Node a transmitting to Node b.

FIG. 10 is an example of configuring transmission power for an IEEE 802.11 device using iwconfig syntax in Linux.

DETAILED DESCRIPTION

Figure 1:
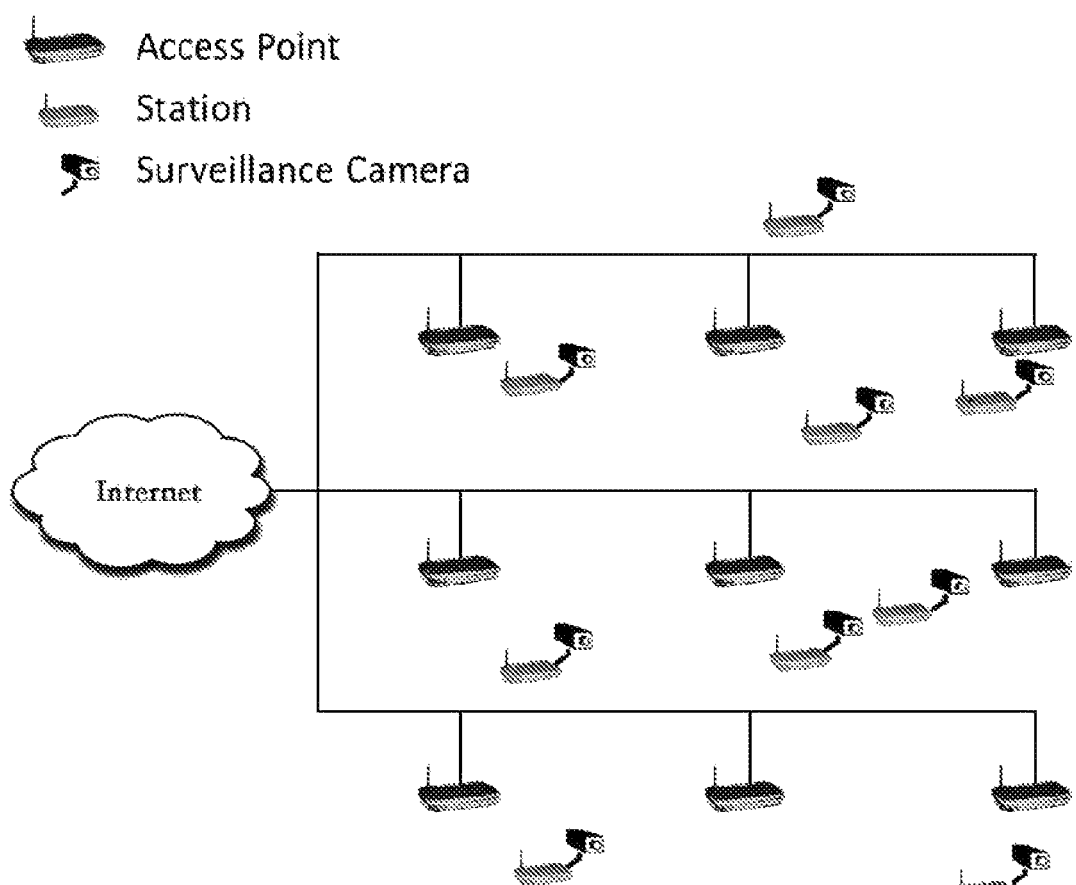
FIG. 1 is a diagram showing the wireless videos surveillance network deployed as a basic scenario for evaluation purpose.

The present disclosure relates to a transmission power control system capable of dynamically selecting optimal transmission power for the nodes in wireless network considering its surrounding interference.

The following pertains to Hidden Node Free Design (HNFD). The prerequisite for IA-TPC (as in DAPC) is the HNFD. The requirements for a HNFD for basic mode in IEEE 802.11 can be summarized as [6]:

1) A range requirement $$CSRange \geq (3+\Delta)r_{max} \quad (1)$$

If K=10, and α=4

$$CSRange \geq 3.78 r_{max} \quad (2)$$

2) and the Receiver Restart (RS) mode turned on.

Where K is defined as signal to interference requirement (e.g. 10 dB), a as path loss exponent and rmax is the maximum distance a node could communicate. Satisfying these two requirements is sufficient to prevent HN, in any general network topology. Also, we have assumed that there are no significant physical obstructions for signal propagation. These two conditions are an assumption for the explanation of the disclosed IA-TPC method below. However, in real life situations, this is not a strict requirement for a device using the present disclosure in a wireless network, the present methods should also work reasonably well in real life situations approaching these conditions.

The following pertains to the Interference Aware Transmission Power Control—Power Adjustment on each Cycle. The disclosed IA-TPC method, as shown in the embodiment of Method 1, is presented and discussed. The transmission power control in IA-TPC is done pair-wise among the active links. An active link is defined as a radio link between two nodes that are within each other's transmission range which is actively exchanging packets. When performing the power reduction in a pair of links, in each cycle, we conservatively assume that the transmit powers of the neighbouring active links are constant and must guarantee that the 3 below properties are not violated:

Property 1) the transmitter and receiver nodes can maintain its link connectivity;

Property 2) no new link-interference edges are created from other active links to itself during the transmission power reduction process, even if the transmission powers of other active links are maintained; and Property 3) no new HNs are created, and the CSRange of the reduced transmission power is still sufficient to cover the interfering nodes.

If all active links satisfy Property 2, no new link-interference edges will be created in the network because each active link assumes the worst-case SIR in its transmission power adjustment. A new link-interference edge would be created from an active Link 2 to a Link 1, if Link 1 were to reduce its transmission power such that the transmissions power from Link 2 could cause packet collisions at either of the nodes in Link 1.

Property 3 with the novel constraint for ACK in IA-TPC is proposed to ensure HN problem is not exacerbated by allowing the carrier sensing mechanism inherent to IEEE 802.11 protocol able to cover the interfering nodes. It is pointed out that the simple combination of Property 1 and Property 2 with the cited state-of-the-art does not lead to the Property 3.

| Method 1 - IA-TPC on each iteration |
|---|
| Require: ActiveLinks ⊂ RadioLinks, n ∈ Nodes, int ∈ n |
| Ensure: iatpc_pnetw = { }, iatpc_pnode = { }, iatpc_pinte = { } |
| 1:    for all $(T_i, \theta_{R_i}, R_i)$ ∈ ActiveLinks do |
| 2:       for all $(T_j, \theta_{R_j}, R_j)$ ∈ ActiveLinks do |
| 3:          $(P_{T_i}^{\theta_{R_j}})_{new} = \max[(P_{T_i}^{\theta_{R_j}})_{P_1}, (P_{T_i}^{\theta_{R_j}})_{P_2}, (P_{T_i}^{\theta_{R_j}})_{P_3}]$ |
| 4:          $(P_{R_i}^{\theta_{T_j}})_{new} = \max[(P_{R_i}^{\theta_{T_j}})_{P_1}, (P_{R_i}^{\theta_{T_j}})_{P_2}, (P_{R_i}^{\theta_{T_j}})_{P_3}]$ |
| 5:       end for |
| 6:    end for |
| 7: |
| 8:    for all n ∈ Nodes do |
| 9:       for all θ ∈ n do |
| 10:          iatpc_pinite.add($P_n^\theta$) |
| 11:       end for |
| 12:       iatpc_pnode.add.(max(iatpc_pinte)) |
| 13:    end for |
| 14:    iatpc_pnetw.add(max(iatpc_pnode)) |
| 15: |
| 16:    return iatpc_pinte, iatpc_pnode, iatpc_pnetw |

The properties for transmission power adjustment on each cycle in IA-TPC are elaborated further below for an arbitrary active link labelled as Link i.

It should be noted that the receiver node is also transmitting radio and the transmitter node is also receiving radio (e.g. acknowledge packets). According to the defined terminology, a transmitter node is a data packet transmitter node and a receiver node is a data packet receiver node. In fact, it is a feature of the present disclosure its symmetry between the two sides of an active link, which has the advantage of the simplicity of its implementation.

The following pertains to Property 1—Use the minimum transmission power sufficient to maintain link connectivity. In an embodiment, transmitter $T_i$ uses the interface $\theta_{R_i}$ to transmit to the interface $\theta T_i$ of receiver $R_i$ and vice versa. The minimum transmit powers due to Property 1 of $T_i$ and $R_i$ are given respectively by Equation 3 and Equation 4 (see also the Power-Transfer Relationship below for more information on the notation used). Property 1 ensures that the reduced powers satisfy the minimum received power threshold required to maintain the link's connectivity. $RX_{th}$ is the received signal strength threshold required to decode a packet. The minimum transmit powers for transmitter $T_i$ and receiver $R_i$ in the direction of its intended node depend positively on the received signal strength threshold $RX_{th}$, required to decode a packet:

$$\left(P_{T_i}^{\theta_{R_i}}\right)_{P_1} = \frac{P_{T_i}^{\theta_{R_i}}}{P(T_i, \theta_{R_i}, R_i)} \times RX_{th} \quad (3)$$

$$\left(P_{R_i}^{\theta_{T_i}}\right)_{P_1} = \frac{P_{R_i}^{\theta_{T_i}}}{P(R_i, \theta_{T_i}, T_i)} \times RX_{th} \quad (4)$$

A difference of this property compared to the DAPC algorithm is the consideration of the direction of transmission θ.

The following pertains to Property 2—Avoid creation of new link-interference edges during transmit power control. In an embodiment, when a transmitter reduces its transmission power, the signal to noise ratio gets weaker at the receiver and new link-interference edges could emerge. According to Property 2, a power transmission level is calculated such that guaranteeing no new link-interference edges are created. A node has to consider the interference from its surrounding links when adjusting its transmit power. Let $N_{T_i}$ and $N_{R_i}$ be the sets of neighbouring nodes that are not interfering with $T_i$ and $R_i$ respectively, but may do so if the power of $T_i$ and $R_i$ are reduced too drastically. We assume that the power of the nodes in $N_{T_i}$ and $N_{R_i}$ do not change when calculating the new power for $T_i$ and $R_i$. We have, $$\left(P_{T_i}^{\theta_{R_i}}\right)_{P_2} \geq \frac{KP(n, \theta_{R_i}, R_i) P_{T_i}^{\theta_{R_i}}}{P(T_i, \theta_{R_i}, R_i)}, \forall n \in N_{R_i} \quad (5)$$

$$\left(P_{R_i}^{\theta_{T_i}}\right)_{P_3} \geq \frac{KP(n, \theta_{T_i}, T_i) P_{R_i}^{\theta_{T_i}}}{P(R_i, \theta_{T_i}, T_i)}, \forall\, n \in N_{T_i} \quad (6)$$

In general, $N_{T_i}$ and $N_{R_i}$ do not need to cover all nodes in the network. Only nodes n that satisfy the following condition have to be considered:

$$n \in N_{T_i} \Leftrightarrow P(n, \theta_{T_i}, T_i) \geq RX_{th}/K \quad (7)$$

$$n \in N_{R_i} \Leftrightarrow P(n, \theta_{R_i}, R_i) \geq RX_{th}/K \quad (8)$$

A difference of this property compared to the DAPC algorithm is the consideration of the direction of transmission θ.

The following pertains to Property 3—Ensuring CSRange of the reduced transmission power is enough to cover interfering nodes. An excessive reduction of transmission power elicited by the sole use of Property 1 also leads to the emergence of additional HNs. This may result to poor throughput due to additional packet collisions caused by these additional HNs. In an embodiment, this property ensures that the carrier sensing avoids HNs after each transmission power adjustment cycle. Let $M_{T_i}$ denote the set of neighbouring transmitters whose link has a link-interference edge to Link i. This means that $\forall m \in M_{T_i}$, the CSRange of $T_i$ must be able to reach m. Therefore, $T_i$ must be able to warn the nodes in $M_{T_i}$ to not to transmit when it transmits through carrier sensing. The same principle applies when deciding the power for $R_i$. To maintain the HN free property, the Equations 9 and 10 must be satisfied.

$$\left(P_{T_i}^{\theta_{R_i}}\right)_{P_3} \geq \frac{P_{T_i}^{\theta_{R_i}}}{P(T_i, \theta_{R_i}, m)} \times CS_{th}, \forall\, m \in M_{T_i} \quad (9)$$

$$\left(P_{R_i}^{\theta_{T_i}}\right)_{P_3} \geq \frac{P_{R_i}^{\theta_{T_i}}}{P(R_i, \theta_{T_i}, m)} \times CS_{th}, \forall\, m \in M_{R_i} \quad (10)$$

Differences of this property compared to the DAPC algorithm is the consideration of the direction of transmission θ, CSRange defined by $CS_{th}$ instead of PCRange and the inclusion of Equation 10 in the method.

In an embodiment, the method works iteratively and it stops when the proposed transmission power of all interfaces of the nodes in the network becomes stable. The following pertains to New Transmission Power Selection for Nodes in Arbitrary Link i. The maximum value from Equations 3, 5, and 9 is selected for $P_{T_i}^{O_{R_i}}$ and $P_{T_i}^{O_{R_i}}$ uses the maximum value of Equations 4, 6, and 10 for Link i as it fulfills the conditions associated to the three properties proposed by IA-TPC.

The selection of new transmission powers for the nodes in a network can be implemented in 3 resolutions (a difference in respect of previous methods).

IA-TPC per network (IA-PNetw)—in this resolution the interfaces in nodes are allowed to reduce their transmission power using the proposed IA-TPC method, but all the interfaces in the network will use the same transmission power (Line 14 in Method 1). Wireless network with nodes using OA and DA use it.

IA-TPC per node (IA-PNode)—in this resolution the interfaces are allowed to reduce its transmission power using the proposed IA-TPC method. Each node is allowed to have its own transmission power but all the interfaces of a node must use the same power (Line 12 in Method 1). Wireless network with nodes using OA and DA use it.

IA-TPC per interface (IA-PInte)—in this resolution each interface is allowed to reduce and use its own transmission power using the proposed IA-TPC method (Line 10 in Method 1). Only wireless network with nodes using DA uses this.

The nodes in $N_{T_i}$, $N_{R_i}$, $M_{T_i}$, and $M_{R_i}$ in Property 2 and Property 3 of IA-TPC define an Interaction Range over which other links can interfere with or can potentially interfere with Link i; faraway nodes outside of Interaction Range not belonging to $N_{T_i}$, $N_{R_i}$, $M_{T_i}$, and $M_{R_i}$ need not to be considered by Link i when adjusting the transmit powers used by its transmitter to send DATA packets and its receiver to send ACK packets. Please note that not all links within Interaction Range can interfere with Link i, but all links outside Interaction Range are guaranteed not to do so.

This pertains to Decoupled Adaptive Power Control. S. C. Liew, in [3], has modelled the DAPC algorithm using the Equations 11-15 for Property 1-3 as shown below.

$$(P_{T_i})_{P_1} = \frac{P_{T_i}}{P(T_i, R_i)} \times RX_{th} \quad (11)$$

$$(P_{R_i})_{P_1} = \frac{P_{R_i}}{P(R_i, T_i)} \times RX_{th} \quad (12)$$

$$(P_{T_i})_{P_2} \geq \frac{KP(n, R_i) P_{T_i}}{P(T_i, R_i)}, \forall\, n \in N_{R_i} \quad (13)$$

$$(P_{R_i})_{P_2} \geq \frac{KP(n, T_i) P_{R_i}}{P(T_i, T_i)}, \forall\, n \in N_{T_i} \quad (14)$$

$$(P_{T_i})_{P_3} \geq \frac{P_{T_i}}{P(T_i, m)} \times RX_{th}^{PCS}, \forall\, m \in M_{T_i} \quad (15)$$

As we are modelling a network with nodes that use DA, Equations 11-15 are not suitable for such a network. We have extended these equations by incorporating the direction of transmission θ as shown in Equations 3-10.

The DAPC algorithm by S. C. Liew was designed to be a node base solution where each node is able to select and use its own transmission power in the network. Wireless network with nodes using DA have additional degree of flexibility, where a node now can have more than one interface and each can operate using its own power. Our proposed IA-TPC considers not just node base solution but also interface and network base solutions.

The DAPC is a distributed algorithm where the nodes in wireless network use the Power Exchange Algorithm for this purpose. In this algorithm the nodes broadcast special Power-Exchange packets periodically to exchange power information with neighbours. As we are keen for a TPC algorithm in the network planning phase or used in SDN where there is a central cloud controller, we do not require the Power Exchange associated protocol. In case a distributed mode of IA-TPC is required, it can be easily transformed using the Power Exchange Algorithm as done by S. C. Liew.

The following pertains to Performance Evaluation of IA-TPC for Directional Antenna. In this section the performance of the IA-TPC for nodes using DA is evaluated by means of simulation using ns-2 [7]. The impact of wireless network with nodes using DA or OA antennas were evaluated. We show that IA-TPC is able to improve the performance of wireless networks that use both DA or OA.

The following pertains to Simulation Setup. It was considered the wireless video surveillance network as presented in FIG. 1 as the basic scenario for our study. The scalability of the proposed IA-TPC is evaluated when a) the station (STA)/Access Point (AP) ratio increases and the network area is fixed; and b) the network area increases and the STA/AP ratio is fixed.

Figure 2:
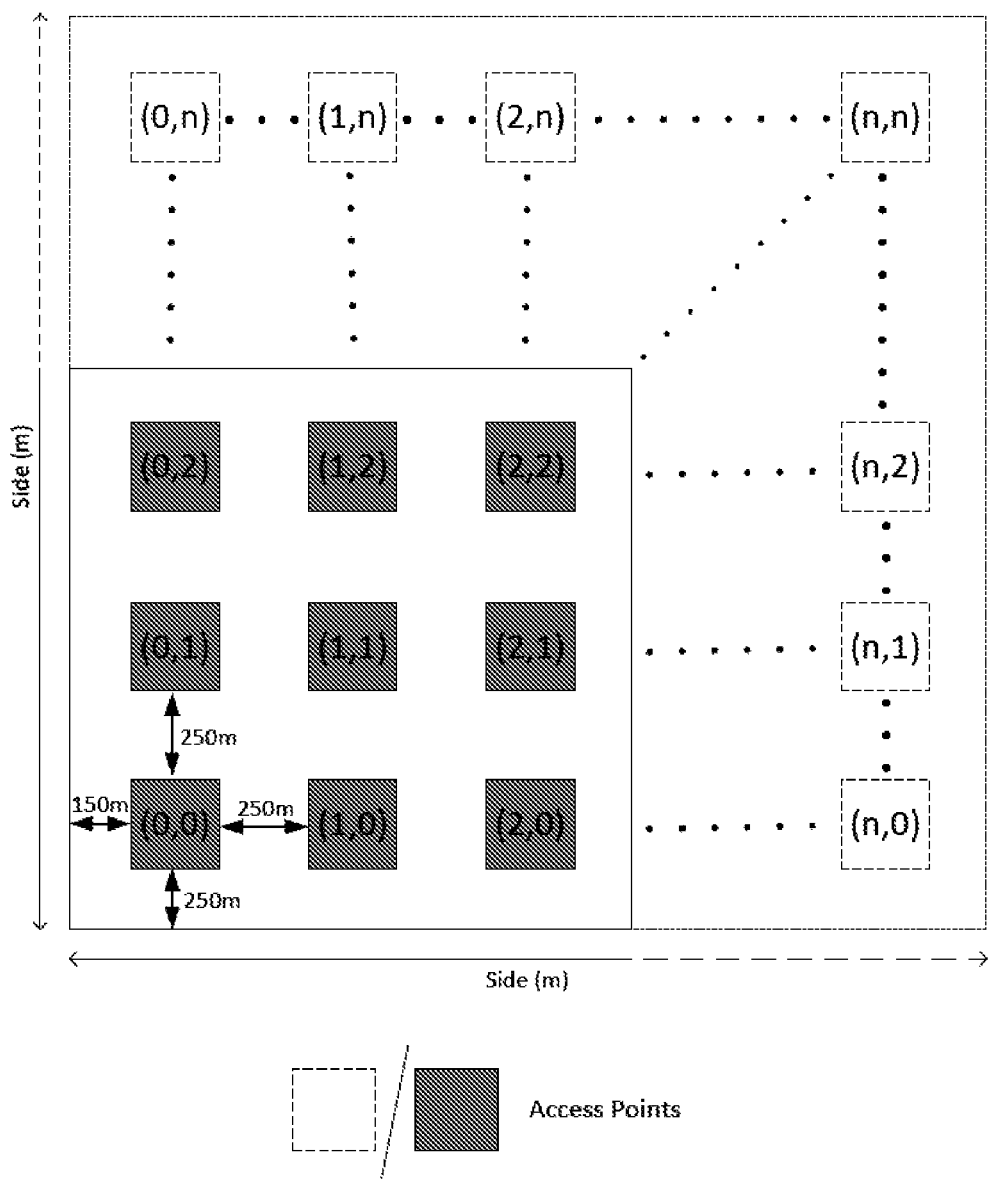
FIG. 2 is a diagram showing the scheme used for the scalability evaluation of the wireless videos surveillance network.

We defined a n×n grid topology with nodes separated by 250 m and acting as APs as shown in FIG. 2. The number of APs is varied from 3 to 4, 5, and 6 aiming to increase the size of the network. The sides of the network are defined as in Equation 16, $$\text{Side} = (n-1) \times 250 + 2 \times 150 \ m \quad (16)$$

where n is the number of AP in one side of the grid. Additional nodes were placed randomly to represent STAs, where each STA will connect to the AP with the strongest signal which is in our model is the closest AP. Traffic is sent from the STAs towards the number of APs replicating the video surveillance network scenario of FIG. 1. Being a single hop wireless network, routing was not considered. All the nodes are static. The number of random STAs in the network varied according to STA:AP ratio of 1, 2, 3, and 4, aiming to increase the amount of interference in the network. For each scenario, 20 random topologies for STA placement were simulated. As we aim to study high interference, the network operates in single channel to induce high interference in the network. The other parameters used in the simulation are shown in Table 1. The traffic load is chosen such that the Interface Queue (IFQ) always have a packet to send. As a node with DA uses 4 interfaces, for correct comparison of aggregated throughput for a network using OA each node is fitted with 4 interfaces of OA. In practice only one interface will be active at any one time due to carrier sensing among node's interfaces.

TABLE 1

Parameter settings used in ns-2.33 simulations

| Parameter | Setting |
| --- | --- |
| Access Scheme | Basic Access Scheme (DATA, ACK) |
| Rate | 11 Mbit/s (Data), 1 Mbit/s (Basic) |
| MAC | IEEE802.11b |
| Offered Load | 55 packet/s/node |
| Traffic Packet Size | 1500 bytes |
| IFQ Length | 50 packets |
| Signal to Interference Ratio | 10 dB |
| Propagation | Two Ray Ground Reflection |
| Contention Window (CW) | 31 (Min), 1023 (Max) |
| ns-2's Default Transmit Power | 281.84 mW |
| Traffic | UDP, Poisson, 1818.181 μs mean inter-arrival interval |
| Simulation Time | 120 s |
| Type of Antenna | OA, DA |
| Antenna Gain | OA:1, DA:2 |
| No. of DA/node | 4, 90° beamwidth each |
| Directional Antenna Angles | 0°, 90°, 180°, 270° |
| No. of Simulations for Each Scenario | 20 |
| No. of APs | 9, 16, 25, 36 |
| No. of STA:AP Ratio | 1, 2, 3, 4 |
| Threshold | Receive: $3.652 \times 10^{-10}$ W, Carrier Sense: $1.559 \times 10^{-11}$ W or $1.789 \times 10^{-12}$ W |

The following pertains to IA-TPC method Evaluation. The IA-TPC method with HNFD as prerequisite is evaluated using 4 setups:

a. Setup 0: OA/DA, DP-NChan, CSRange:RXRange ratio 2.20, No RS mode—This is the default IEEE 802.11 setup. It considers the default settings of ns-2. The Carrier Sensing threshold is set to $1.559 \times 10^{-11}$ W making the Carrier Sensing and Receiving Sensing threshold ratio to 2.20. All nodes operate without Receiver Restart mode. OA and DA use this setup.

b. Setup 1: OA/DA, IA-PNetw, CSRange:RXRange ratio 3.78, RS mode—This setup considers Setup 0 using the proposed IA-TPC where the transmission power of the nodes are adjusted such that all the nodes in the network use the same power. The Carrier Sensing threshold is set to $1.789 \times 10^{-12}$ W making the Carrier Sensing and Receiving Sensing threshold ratio to 3.78. All nodes operate with Receiver Restart mode turned ON to enable the HNFD which is a prerequisite of IA-TPC. OA and DA use this setup.

c. Setup 2: OA/DA, IA-PNode, CSRange:RXRange ratio 3.78, RS mode—This setup considers Setup 1 using the proposed IA-TPC but now the transmission power of the nodes are adjusted such that all the nodes in the network are able to use its own unique transmission power. OA and DA use this setup.

d. Setup 3: OA/DA, IA-Plnte, CSRange:RXRange ratio 3.78, RS mode—This setup considers Setup 2 using the proposed IA-TPC but now each interface is allowed to choose its own transmission power. Only DA uses this setup.

Figure 3:
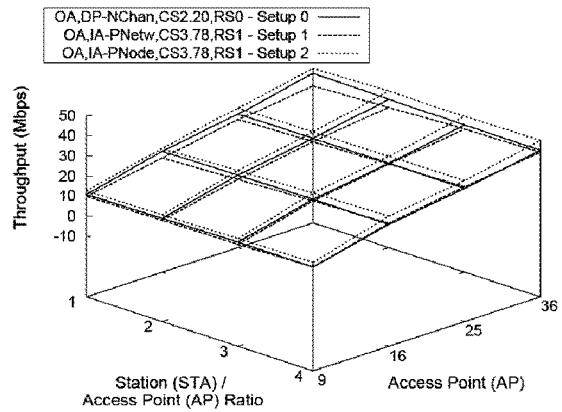
FIG. 3 is a chart showing the aggregate throughput result for the disclosure IA-TPC method, wherein (a) represents omnidirectional antenna; (b) represents directional antenna.
Figure 3:
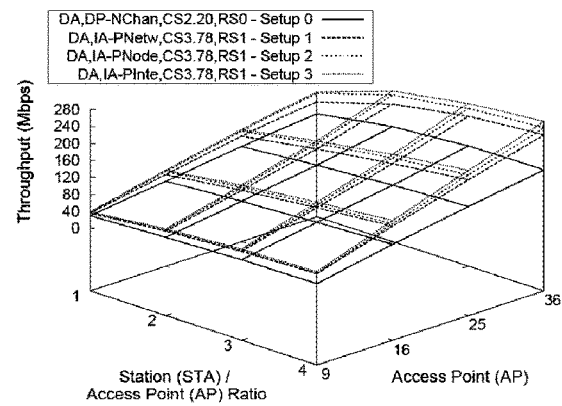
Figure 4:
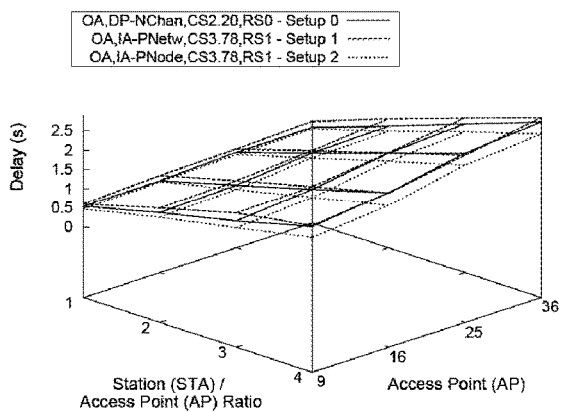
FIG. 4 is a chart showing the delay result for the disclosure IA-TPC method, wherein (a) is omnidirectional antenna; wherein (a) represents the omnidirectional antenna; (b) represents the directional antenna.
Figure 4:
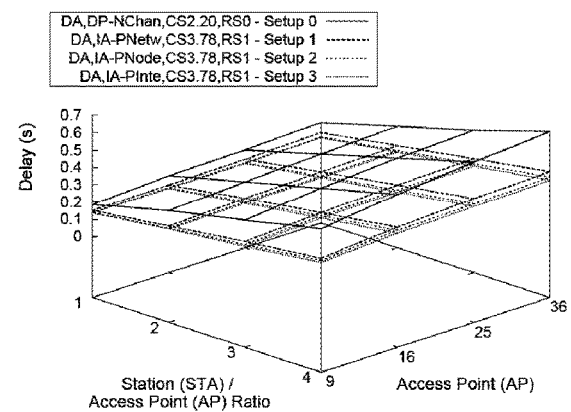

In RS mode, when a node currently receiving a packet and another packet with stronger received power arrives, the receiver node can switch to receive the stronger packet as long as its power is higher than K compared with the current packet. RS mode can be enabled in some IEEE 802.11 products. The results for throughput and delay of the wireless network are shown in FIG. 3 and FIG. 4. The graphs on the left of the figures represent wireless networks with nodes using OA, and the ones on the right represent wireless networks with nodes using DA. The solid, long dashed, short dashed lines and dotted lines are used to represent Setup 0-3, respectively.

The following pertains to IA-TPC—Results and Discussion. In this section the results for the IA-TPC method are presented and discussed. We evaluate the IA-TPC over a wireless network as described above. The gain of IA-TPC is evaluated when the method adjusts its power per network (IA-PNetw), per node (IA-PNode), and per interface (IA-Plnte), and compared against the default IEEE 802.11 wireless network which is used for benchmarking. The simulation results used in this discussion are those presented in FIGS. 3 and 4.

The following pertains to Transmit Power Control by Network (IA-PNetw). To evaluate the gain of IA-PNetw, the throughput results of Setup 0 are compared with Setup 1. Setup 0 represents the default mode of wireless network that operates without any transmit power control (DP-NChan). In Setup 1, the IA-PNetw is implemented and this method is used by wireless network with nodes using OA as well as wireless network with nodes using DA. The objective of the IA-PNetw is to adjust the transmission power of the nodes such that all the nodes in the network use the same power.

The following pertains to Throughput (IA-PNetw). The values of throughput are approximately constant at around 10 Mbit/s for OA in Setup 1 when the STA:AP ratio increases and the number of AP is 9. When the number of AP increases, the throughput also increases. However for the same number of AP, irrespective of STA:AP ratio, the throughput remains constant. In all the number of AP and STA:AP ratio configurations, IA-PNetw has loss in terms of throughput when compared with Setup 0. In the case of DA we can observe that throughput increases as the STA:AP ratio increases. The throughput is 68 Mbit/s for a STA:AP ratio of 4 when the number of AP is 9 for Setup 1. The throughput is 55% more than the throughput obtained Setup 0. When the number of APs increases, the throughput also increases. In the case of 36 APs and a STA:AP ratio of 4, the throughput obtained is 221 Mbit/s. Contrary of the case in OA, in DA for all the number of AP and STA:AP ratio configuration, IA-PNetw has gain in terms of throughput when compared with Setup 0. The highest gain is 60% and it is obtained when the number of APs is 36 and the STA:AP ratio is 4. This shows IA-PNetw is attractive for wireless network with nodes using DA and it enables higher network throughputs.

The following pertains to Delay (IA-PNetw). In the case of OA, we can observe that the mean delay increases as the STA:AP ratio increases and when the number of AP increases. Setup 1 has higher delay than Setup 0 in most of the STA:AP ratios and AP configurations. When the number of AP is 36 and the STA:AP ratio is 4, the delay is 2730 ms for Setup 0 and 3150 ms for Setup 1. At this configuration, the mean delay of Setup 1 is 15% higher than the delay of Setup 0.

In the case of DA, we can observe that the mean delay increases as the STA:AP ratio increases. The delay is 305 ms for the STA:AP ratio of 4 when the number of AP is 9 for Setup 1. This value is 37% lesser than the delay obtained Setup 0. When the number of AP is incremented, the delay values also increase. In the case of 36 APs and a STA:AP ratio of 4, the delay obtained is approximately 375 ms for Setup 1. Contrary of the case in OA, in DA for all the number of AP and STA:AP ratio configuration, IA-PNetw has a gain in terms of delay when compared with Setup 0. The highest gain obtained is 50% when the number of AP is 36 and the STA:AP ratio is 4 for Setup 1.

This shows that not always IA-PNetw results in better delays when comparing with the default setup for wireless network with nodes using OA, but IA-PNetw is attractive when used in wireless network with nodes using DA.

The following pertains to Transmit Power Control by Node (IA-PNode). To evaluate the gain of IA-PNode, the throughput results from Setup 0 are compared with Setup 2. In Setup 2, the IA-PNode is implemented and this method is used by wireless network with nodes using OA as well as wireless network with nodes using DA. The objective of the IA-PNode is to adjust the transmission power of the nodes such that all the nodes in the network are able to use its own unique transmission power.

The following pertains to Throughput (IA-PNode). The throughput is approximately constant around 13 Mbit/s for OA in Setup 2 when the STA:AP ratio increases and the number of AP is 9. This is 30% increase when compared with Setup 1 and, more importantly, this is approximately 13% higher than the throughput observed in Setup 0, which is the default setup. When the number AP increases, the throughput also increases; however for the same number of AP, irrespective of STA:AP ratio, the throughput remains constant. In all the number of AP and STA:AP ratio configuration, IA-PNode has gains when compared with Setup 1 and Setup 0.

In the case of DA, we can observe that the throughput increases as the STA:AP ratio increases. The throughput is approximately 69 Mbit/s for a STA:AP ratio of 4 when the number of AP is 9. This value is approximately 57% more than the throughput obtained for Setup 0. When the number of APs increases, the throughput also increases. In the case of 36 APs and a STA:AP ratio of 4, the throughput obtained is 237 Mbit/s. In general IA-PNode has gains when compared with Setup 0 and Setup 1. The highest gain obtained is 72% when AP is 36 and the STA:AP ratio is 4 compared with Setup 0. This shows IA-PNode is attractive for wireless network with nodes using both OA and DA and enable to achieve higher network throughput. Comparing with IA-PNetw, IA-PNode has higher throughput for both OA and DA for all the number of APs and STA:AP ratios. Hence IA-PNode is a better method than IA-PNetw in order to have the highest throughput for a wireless network.

The following pertains to Delay (IA-PNode). The mean delay increases for OA in Setup 2 when the STA:AP ratio increases and the number of AP is 9. When the STA:AP ratio is 4 and the number of AP is 9 the delay is 1660 ms. This value is 16% lower when compared with Setup 1 for the same configuration. When the number of AP increases, the delay increases. In all the number of AP and STA:AP ratio configurations, IA-PNode has gain when compared with Setup 1 and Setup 0.

In the case of DA, we can observe that the mean delay increases as the STA:AP ratio increases for Setup 2. The delay is approximately 290 ms for a STA:AP ratio of 4 when the number of AP is 9. This value is approximately 40% lower than the delay obtained Setup 0. When the number of AP increases, the delay for Setup 2 increases. In the case of 36 APs and a STA:AP ratio of 4, the delay obtained is 344 ms. In general IA-PNode has gains when compared with Setup 0 and Setup 1. The highest gain is 54% obtained when AP is 36 and the STA:AP ratio is 4 when compared with Setup 0. This shows IA-PNode is attractive for wireless network with nodes using both OA and DA to achieve lower network delay. Comparing with IA-PNetw, IA-PNode has lower mean delay for both OA and DA for all the number of APs and STA:AP ratios. Hence IA-PNode is a better method than IA-PNetw.

The following pertains to Transmit Power Control by Interface (IA-Plnte). To evaluate the gain of IA-Plnte, the throughput results from Setup 0 are compared with Setup 3. In Setup 3, the IA-Plnte is implemented and this method is only used by wireless network with nodes using DA. The objective of the IA-Plnte is to adjust the transmission power of the nodes such that each interface is allowed to choose its own transmission power.

The following pertains to Throughput (IA-Plnte). In the case of DA, we can observe that the throughput value increases as the STA:AP ratio increases. The throughput is approximately 72 Mbit/s for a STA:AP ratio of 4 when the number of AP is 9. This value is 62% more than the throughput obtained with Setup 0. When the number of AP increases, the throughput also increases. In the case of 36 APs and a STA:AP ratio of 4, the throughput is 252 Mbit/s. Overall, IA-Plnte has gain in terms of throughput when compared with Setup 0 and Setup 2. The highest gain obtained at 81% is when AP is 36 and the STA:AP ratio of 4 when compared with Setup 0.

This shows IA-Plnte is attractive for wireless network with nodes using DA to achieve higher network throughput. Comparing with IA-PNode and IA-PNetw, IA-Plnte presents the highest throughput for DA for all the number of APs and STA:AP ratios. Hence IA-Plnte is the best method for having high throughputs for wireless network with nodes using DA.

The following pertains to Delay (IA-Plnte). In the case of DA we can observe that the delay increases as the STA:AP ratio increases for Setup 3. The delay is 281 ms for a STA:AP ratio of 4 when the number of AP is 9. This value is 42% lower than the delay obtained for Setup 0. When the number of AP values increases, the delay also increases. In the case of 36 APs and a STA:AP ratio of 4, the delay obtained is 326 ms. Overall, IA-PInte has gain in terms of delay when compared with Setup 0 and Setup 2. The highest gain obtained is 56% when AP is 36 and the STA:AP ratio is 4 when compared with Setup 0.

This shows IA-PInte is attractive for wireless network with nodes using DA to achieve lower network delays. Comparing with IA-PNode and IA-PNetw, IA-PInte has lowest mean delay for DA for all the number of APs and STA:AP ratios. Hence IA-PInte is the best method regarding mean delay for a wireless network with nodes using DA.

Figure 5:
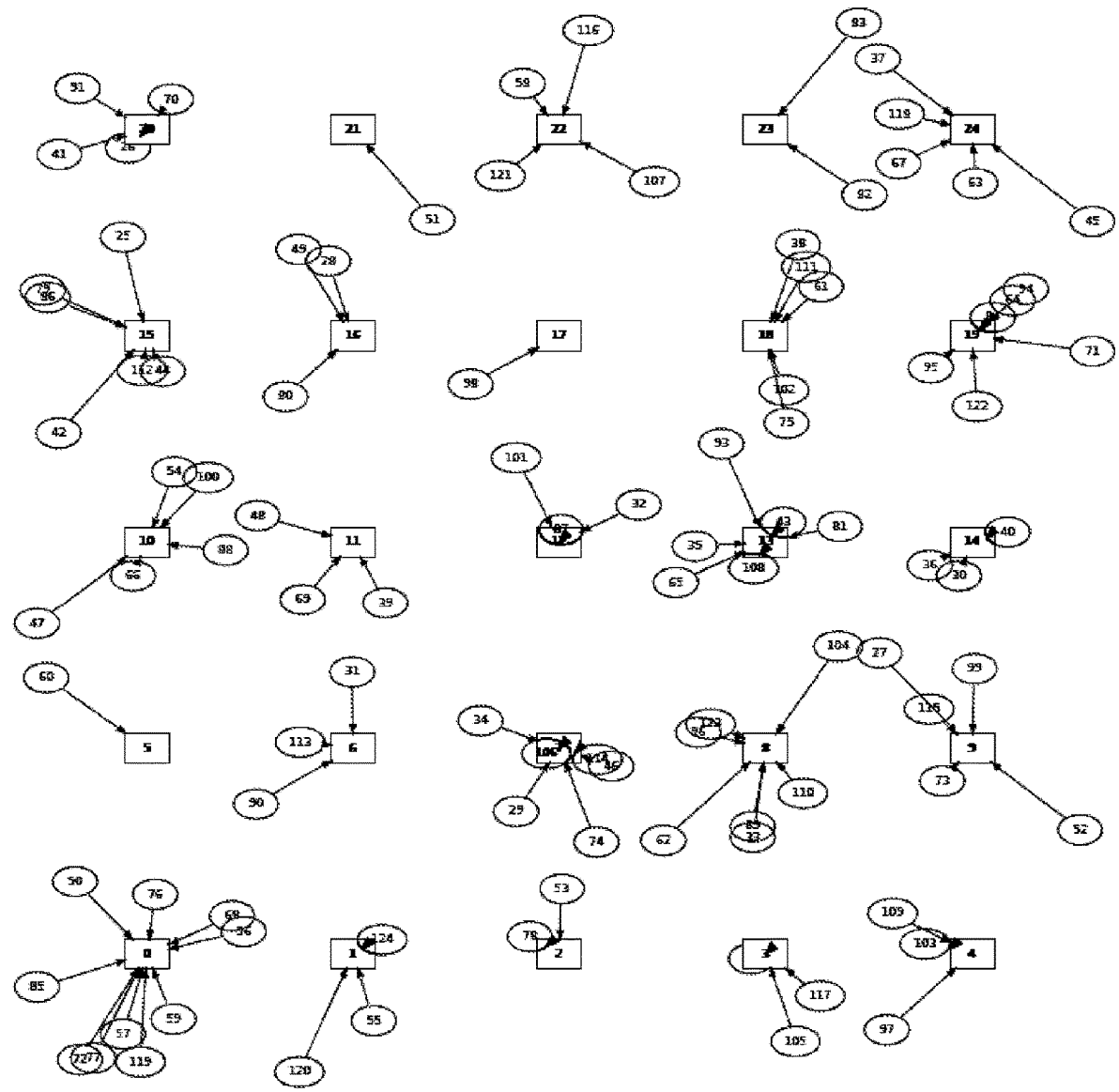
FIG. 5 is a diagram showing a sample topology consisting of 25 APs and 100 STAs used to discuss number of iterations required to decide the best transmission power for the nodes in the network.

The following pertains to Iteration Analysis for Improved Decoupled Adaptive Power Control. The transmission power adjustment for IA-TPC is done by a number of iterations for an arbitrary active link using the method and the properties presented above. The iteration cycles are stopped when the transmission power of the nodes in the network cannot be further reduced. To analyse and discuss the number of iterations required by the disclosed IA-TPC method a sample topology consisting of 25 APs and 100 STAs is considered, as shown in FIG. 5. The square node represents an AP and the circle node represents a STA. The solid blue lines represent DATA transmission direction of a STA towards the number of AP it is associated with.

Figure 6:
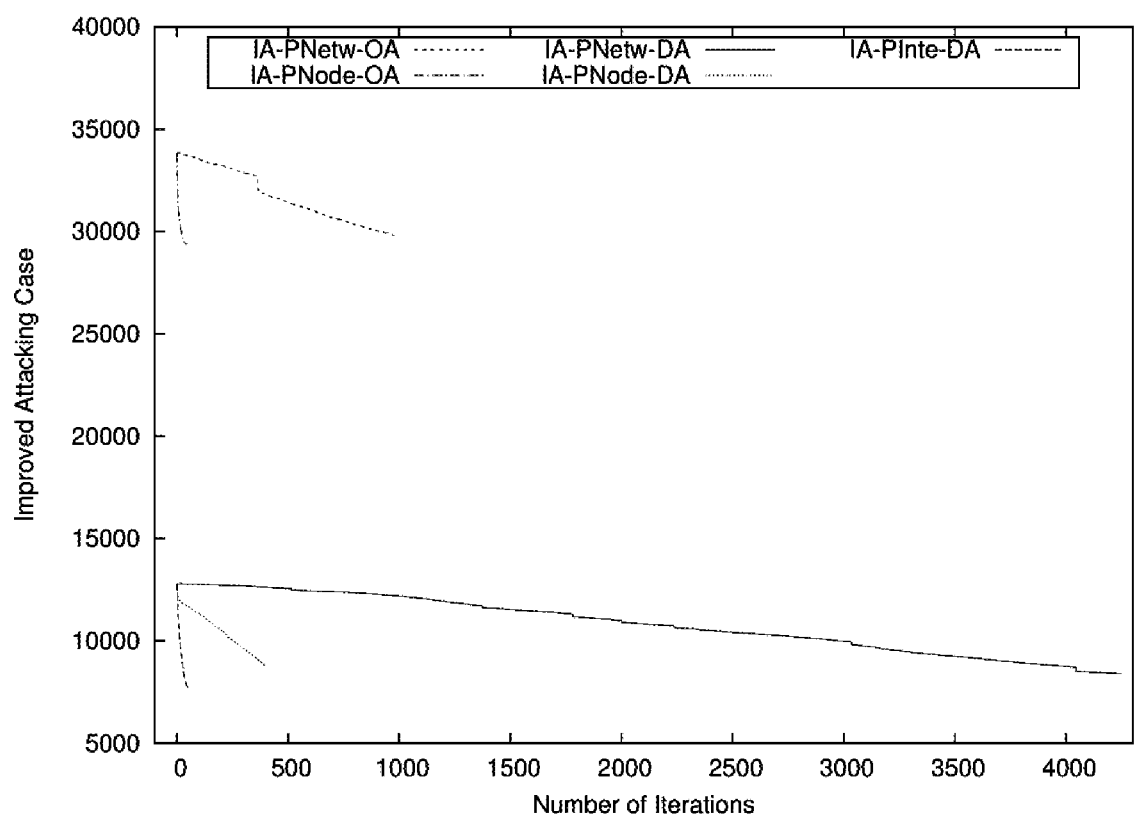
FIG. 6 is a chart showing the number of iterations required to decide the best transmission power for the nodes in the network for a sample topology consisting of 25 APs and 100 STAs.

The number of iterations required for the IA-TPC method for the topology in FIG. 5 is shown in FIG. 6. The IA-TPC is analysed when the method adjusts its power per network (IA-PNetw), per node (IA-PNode) and per interface (IA-PInte) considering OA and DA. The number of iterations is related with improved Attacking Case [8]. A high improved Attacking Case value leads to potentially poor aggregated network throughput and high delay. When the sample topology uses OA, initially the improved Attacking Case is approximately 34000. This initial point refers to the HNFD where the topology uses CSRange:RXRange ratio of 3.78 with RS mode turned ON.

When IA-PNetw is used, the method takes 980 iterations before deciding the best power for the nodes in this topology. The new proposed transmission power reduces the improved Attacking Case to approximately 29800. When IA-PNode is used, the algorithm now takes only 50 iterations to decide the best power for the nodes and the proposed transmission powers reduce the improved Attacking Case to approximately 29400 from the initial 34000. The IA-PNode is not only 20 times faster but it is also able to reduce the improved Attacking Case much more than IA-PNETW suggesting better throughput for the topology when OA is used for a wireless network.

The topology now considers DA. Initially the improved Attacking Case for HNFD is approximately 12800. When IA-PNetw is used, the algorithm takes 4247 iterations before deciding the best power for the nodes in this topology. The new proposed transmission power using IA-PNETW reduces the improved Attacking Case to approximately 8500. When IA-PNode is used, the algorithm takes 399 iterations to decide the best power for the nodes and this proposed transmission power results on improved Attacking Case to approximately 8700. When IA-PInte is used, the algorithm takes only 56 iterations to decide the best power for the nodes and this proposed transmission power results the improved Attacking Case to approximately 7700.

We can conclude that IA-PNode takes a lesser number of iteration than IA-PNetw, and IA-PInte takes lesser number of iteration than IA-PNode. IA-PInte results in the lowest improved Attacking Case suggesting high throughput can be obtained if the proposed powers are used. The reduction of power of a particular resolution of IA-TPC not always results in better improved Attacking Case; as seen, IA-PNetw has lower improved Attacking Case than IA-PNode. The gain obtained during the transmission power control process depends on the network topology. Although DA has better improved Attacking Case when compared of OA, it leads to a higher number of iterations when compared to the same resolution of algorithm for OA and DA. The higher gain of DA contributes to the longer time needed to compact the transmission power of the nodes.

Figure 7:
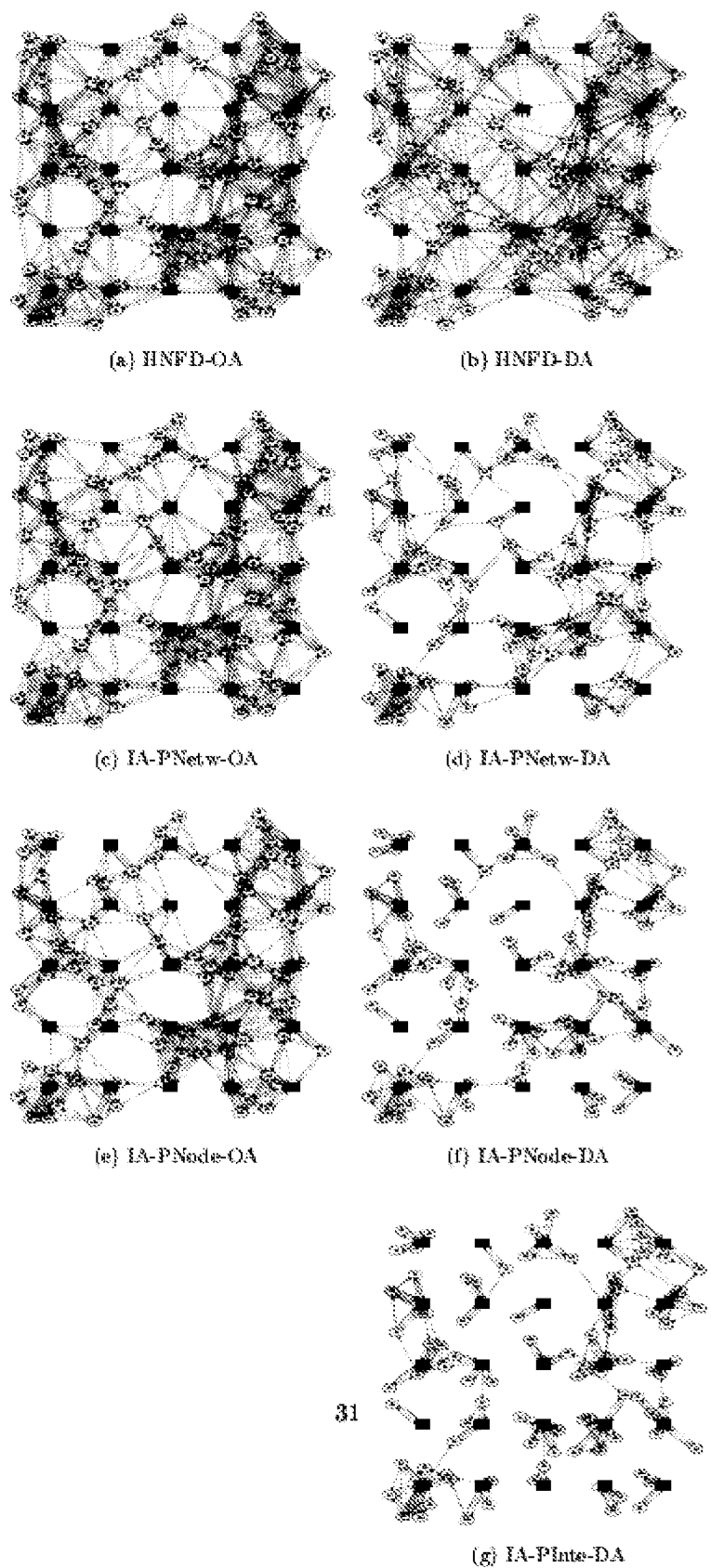
FIG. 7 is a diagram showing the interference representation using TXRanges for the topology in FIG. 5 using the disclosure IA-TPC in PNetw, PNode and Plnte resolution when the network using nodes with OA and DA.

The interference existing due to TXRanges for the IA-PNetw, IA-PNode and IA-PInte transmission power control schemes for the topology in FIG. 5 are shown in FIG. 7. The interference existing due to CSRanges for the transmission power control schemes are not shown in the figure for simplicity. From FIG. 7 we can conclude that the interference is reduced when the IA-TPC algorithm is used. There is visible reduction in interference when IA-PNetw, IA-PNode or IA-PInte are used. This is well captured by our proposed improved Attacking Case metric.

The following pertains to the shortcomings of Minimal Transmit Power. Consider the scenario of FIG. 8 where the nodes use OA. Link 1 consists of Transmitter 1 ($T_1$) and Receiver 1 ($R_1$) nodes and Link 2 consisting of Transmitter 2 ($T_2$) and Receiver 2 ($R_2$) nodes, communicate using the basic access mode (no RTS/CTS packets) of IEEE 802.11 protocol. In basic access mode, a transmitter transmits a DATA packet and receives an ACK packet, and a receiver transmits an ACK packet and receives a DATA packet.

TABLE 2

Default parameter settings in ns-2.33

| Parameter | Setting |
|---|---|
| OA Gain | 1 |
| Antenna Height | Transmitter: 1.5 m, Receiver: 1.5 m |
| K | 10 |
| α | 4 |
| Transmit Power | 281.84 mW |
| Threshold | Receive ($RX_{th}$): $3.65 \times 10^{-10}$ W, Carrier Sense ($CS_{th}$): $1.56 \times 10^{-11}$ W |
| TXRange | 250 m |
| CSRange | 550 m |

By using the default parameter values in Network Simulator 2 (ns-2), as shown in Table 2 [7], we find that $P(T_1,\theta_{R_1},R_1) > KP(T_2,\theta_{R_1},R_1)$ (see Power-Transfer Relationship for notation) and Link 2 does not interfere with Link 1 when both of the links send DATA packets at the same time ($DATA_2-DATA_1$). However Link 2 interferes with Link 1 at $T_1$ during the $DATA_2-ACK_1$ since $P(R_1,\theta_{T_1},T_1) < KP(T_2,\theta_{T_1},T_1)$ Observing that $T_2$, $T_1$ and $R_1$ are within each other's carrier sensing range, CSRange=550 m, the potential collision can be prevented by using the physical and virtual carrier sensing mechanisms.

Suppose that now we adjust the transmit powers of the four nodes to their minimum where the received power is sufficient to decode a packet. After the adjustment, $$P(T_1,\theta_{R_1},R_1)=P(R_1,\theta_{T_1},T_1)=P(T_2,\theta_{R_2},R_2)=P(R_2,\theta_{T_2},T_2)$$
$$=RX_{th}=3.65\times10^{-10}\text{ W}$$

and the TXRanges of Link 1 and Link 2 become 15 m and 30 m, respectively. Now, $KP(T_2,\theta_{T_1},T_1)=1.23\times10^{-10}$ W$<RX_{th}=P(R_1,\theta_{T_1},T_1)$ but $KP(T_2,\theta_{R_1},R_1)=1.41\times10^{-09}$ W$>RX_{th}P(T_1,\theta_{R_1},R_1)$. Thus, the transmission of DATA packets from $T_2$ intended to $R_2$ can interfere with the reception of DATA from $T_1$ to $R_1$ now. Moreover, the CSRange of $T_1$=2.2×15 m=33 m<|$T_1-T_2$| after the minimum transmit power control. This means that Link 1 cannot forewarn Link 2 when Link 1 transmits. So, we observe that the use of minimum transmit power creates the possibility of $DATA_2$–$DATA_1$ collisions. Furthermore, these collisions cannot be prevented by the carrier sensing mechanisms causing the classical Hidden Node (HN) problem. The use of minimum transmit powers are highly undesirable in this case.

The following pertains to the shortcomings of DAPC Algorithm. The DAPC algorithm is not suitable for wireless network with nodes using DA as it did not consider a node's direction of transmission θ.

S. C. Liew has considered the PCSRange when modelling the concept of Interference Range. PCSRange refers to the physical carrier sensing ranges by the transmission of DATA packets [3]. For the correct operation of the physical layer beam antenna $\Theta(.)$ translates to the beam id that radiates in the direction of angle $\theta(.)$; in multi-interface DA system $\Theta(.)$ translates to the interface id that radiates in the direction of angle $\theta(.)$.

The following pertains to an example of IA-TPC being used as it is in IEEE 802.11 based wireless networks as off the shelf IEEE 802.11 products such as access points and wireless USB adapters readily supports manual transmission power changes though it is factory set to a default value. The flexibility to dynamically change the transmission power values are not explored by these products as there is no sufficient intelligence to guarantee the performance of wireless network would not deteriorate. IA-TPC is ready to fill this space should it come into this field. The table below, shows how transmission power can be set for an arbitrary wireless interface labelled as wlan0 using txpower parameter in iwconfig syntax in Linux [10].

```
NAME
    iwconfig - configure a wireless network interface
SYNOPSIS
    iwconfig interface [essid X] [nwid N] [mode M] [freq F]
            [channel C][sens S ][ap A ][nick NN ]
            [rate R] [rts RT] [frag FT] [txpower T]
            [enc E] [key K] [power P] [retry R]
            [modu M] [commit]
PARAMETERS
    txpower
        For cards supporting multiple transmit powers, sets the transmit
        power in dBm. If W is the power in Watt, the power in dBm is P =
        30 + 10.log(W). If the value is postfixed by mW, it will be
        automatically converted to dBm.
        Example :
            iwconfig wlan0 txpower 20
OUTPUT
    (see Fig. 10)
``` we have considered the CSRange which is limited by the carrier sensing range of any packets sent over a wireless channel. This is because all packets, not limiting to DATA packets enable, carrier sense functionality at the receiving interface. We had also considered the constraint due to the ACK packets in Property 3 of the IA-TPC algorithm.

The following pertains to Power-Transfer Relationship (see FIG. 9). The power-transfer relationship of node a transmitting to node b is defined by Equation 17, $$P(a,\theta_b,b)=c(a,\theta_b,b) \cdot P_a^{\theta_b}/r^\alpha \quad (17)$$

where $P(a,\theta_b,b)$ is the power received by node b from the direction $\theta_b$ of node a, and $P_a^{\theta_b}$ is the power transmitted by node a in the direction of node b as shown in FIG. 9. r is the distance between the two nodes, a is the path-loss exponent, and $c(a,\theta_b,b)$ is a constant in the direction of node b from node a. For instance, for the two-ray ground reflection radio propagation model, α is 4 and $c(a,\theta_b,b)$ is defined as in Equation 18, $$c(a,\theta_b,b)=(G_a^{\theta_b} \cdot G_b^{((\theta_b+180°)mod\ 360°)} \cdot h_a^2 \cdot h_b^2) \quad (18)$$

where $G_a^{\theta_b}$ is the antenna gain of node a in the direction of node b, and $G_b^{((\theta_b+180°)mod\ 360°)}$ is the antenna gain of node b in the direction of node a. Both of these gains are unit-less [9]. $h_a$ and kb are the heights of node a's and node b's antennas respectively. Similar relationship as in Equation 18 can be derived for other radio propagation models. $\Theta(.)$ is suitable to represent any type of DA such as switched beam antenna, steerable beam antenna, adaptive array antenna or several elements of passive DAs connected via multiple interfaces. The present definition is straightforward for steerable beam antenna and adaptive array antenna; in switched The term "comprising" whenever used in this document is intended to indicate the presence of stated features, integers, steps, components, but not to preclude the presence or addition of one or more other features, integers, steps, components or groups thereof. It will be appreciated by those of ordinary skill in the art that unless otherwise indicated herein, the particular sequence of steps described is illustrative only and can be varied without departing from the disclosure. Thus, unless otherwise stated the steps described are so unordered meaning that, when possible, the steps can be performed in any convenient or desirable order.

It is to be appreciated that certain embodiments of the disclosure as described herein may be incorporated as code (e.g., a software algorithm or program) residing in firmware and/or on computer useable medium having control logic for enabling execution on a computer system having a computer processor, such as any of the servers described herein. Such a computer system typically includes memory storage configured to provide output from execution of the code which configures a processor in accordance with the execution. The code can be arranged as firmware or software, and can be organized as a set of modules, including the various modules and algorithms described herein, such as discrete code modules, function calls, procedure calls or objects in an object-oriented programming environment. If implemented using modules, the code can comprise a single module or a plurality of modules that operate in cooperation with one another to configure the machine in which it is executed to perform the associated functions, as described herein.

The disclosure should not be seen in any way restricted to the embodiments described and a person with ordinary skill in the art will foresee many possibilities to modifications thereof. The above described embodiments are combinable. The following claims further set out particular embodiments of the disclosure.

The following references, should be considered herewith incorporated in their entirety:

[1] N. Li, P. Guo, and J. Zhao, *IACT-MAC: A New Interference Avoidance and Parallel Transmission MAC Protocol*, Journal of Applied Science and Engineering, Vol. 18 (2) (2015), pp. 129-134. DOI:10.6180/jase.2015.18.2.04.

[2] Y.-C. Tsai, and S.-L. Su, *An SINR-based Routing and MAC Design for QOS in Wireless Ad Hoc Networks*, Journal of Wireless Network. Vol. 21 (4) (2015), pp. 1141-1154. DOI: 10.1007/s11276-014-0840-9.

[3] I.-H. Ho, and S. C. Liew, Impact of Power Control on Performance of IEEE 802.11 Wireless Networks, IEEE Transactions on Mobile Computing, Vol. 6 (11) (2007), pp. 1245-1258. DOI: 10.1109/TMC.2007.1045.

[4] Y. Li, M. Li, W. Shu, and M.-Y. Wu, FFT-DMAC: A Tone Based MAC Protocol with Directional Antennas, IEEE Global Telecommunications Conference (GLOBECOM '07), 2017, pp. 3661-3665. DOI:10.1109/GLOCOM.2007.695.

[5] S. Kandasamy, C. Marques, T. Calcada, M. Ricardo, R. Matos, and S. Sargento, *Call Admission Control for Wireless Mesh Network based on Power Interference Modeling using Directional Antenna*, Springer's Journal of Wireless Networks, Vol. 22 (7) (2016), pp. 2299-2316. DOI:10.1007/s11276-015-1096-8. [6] L. B. Jiang, and S. C. Liew, Hidden-node Removal and Its Application in Cellular Wi-Fi Networks, IEEE Transactions on Vehicular Technology, Vol. 56 (5) (2007), pp. 2641-2654. DOI: 10.1109/TVT.2007.900393.

[7] The Network Simulator 2 (ns-2), http://www.isi.edu/nsnam/ns/.

[8] S. Kandasamy, R. Morla, and M. Ricardo, *Power Interference Modeling for CSMA/CA Based Networks Using Directional Antenna*, Elsevier's Journal of Computer Communications, Vol. 86 (5) (2016), pp. 86-98. DOI: 10.1016/j.comcom.2016.01.012.

[9] C. Balanis, *Antenna Theory: Analysis and Design*, 3rd Edition, Wiley, 2012.

[10] http://manpages.ubuntu.com/manpages/zesty/man8/iwconfig.8.html, Ubuntu 17.04 Manual It is disclosed a system and method for a transmission power control for IEEE 802.11 based wireless network with nodes using directional antenna (DA) is shown. The system improves the throughput performance of IEEE 802.11 based wireless networks with nodes using DAs by judiciously reducing the network's interference. The disclosed Interference Aware Transmission Power Control (IA-TPC) system and method can be advantageously backward compatible as it can also be used in wireless networks with nodes using omnidirectional antennas (OA). In an embodiment of IA-TPC, a node considering to adjust its transmission power needs to collect information from neighbouring nodes that are within a particular distance and adjusts its power via a number of iterations, considering the following properties when controlling the transmission power: 1) the transmitter and receiver nodes can maintain its link connectivity; 2) no new link-interference edges are created from other active links to itself during the transmission power reduction process, even if the transmission powers of other active links are not reduced; and 3) no new hidden nodes are created, and the carrier sensing range (CSRange) of the reduced transmission power is still sufficient to cover the interfering nodes. The disclosed method is suitable to be used: a) in the software defined networking (SDN) paradigm where the algorithm is placed in the cloud server which receives or sends control messages; b) as a network planning software where the algorithm suggests the optimal power for either a network, node or interface in order for the wireless network able to transport higher amount of traffic. IA-TPC is ready to be incorporated in the present IEEE 802.11 based wireless network without much difficulty should this technology comes to this field.

The invention claimed is:

1. An interference-aware transmission power control method for wireless network nodes in a network having pair-wise active links, each having a directional antenna, comprising the steps of, for an individual node, for each active link of said individual node, an active link having a transmitter interface and a receiver interface:

calculating a reduced transmitted power which cause a corresponding reduced received power, such that:

(a) the transmitter interface and the receiver interface configure to maintain connectivity of the active link with the reduced transmitted power in the directional antenna between the transmitter interface and the receiver interface;

(b) the reduced transmitted power does not create additional link-interference edges from any other active link, even if transmission power of the other active link is maintained, in the antenna direction between the transmitter interface of the other active link and the receiver interface; and (c) the reduced transmitted power does not create additional hidden nodes, such that a CSRange of the reduced transmitted power is still sufficient to inhibit transmission by any other interfering network node interface in the antenna direction between said any other interfering network node and the receiver interface.

2. The method according to claim 1, wherein (a) comprises calculating the reduced transmitted power such that the reduced received power at the receiver in the direction of transmission between the transmitter interface and the receiver interface of the active link will be above the minimum received power threshold required to maintain connectivity of the active link.

3. The method according to claim 1, wherein (b) comprises calculating the reduced transmitted power such that the reduced received power at the receiver will be above the minimum received power threshold required to avoid interference from any other network node other than the transmitter and receiver interfaces of the active link, in the direction of transmission between the other network node and the receiver interface.

4. The method according to claim 3, wherein the other network node is limited to the network nodes that have a power received at the receiver from the other network node in the direction of transmission between the other network node and the receiver interface above a received signal strength threshold required to decode a packet.

5. The method according to claim 1, wherein (c) comprises calculating the reduced transmitted power such that, for any other network node that has a link-interference edge to the active link, the reduced received power at the other network node will be above a minimum received power threshold required to inhibit the other network node interface from transmitting, when using a Carrier Sense Range, CSRange.

6. The method according to claim 5, wherein Carrier Sense Range is defined by a Carrier Sense Threshold, CSth, such that if the received energy in a wireless channel is above CSth, the channel is considered busy and transmission is inhibited.

7. The method according to claim 1, wherein Carrier Sense Range is applied to any packet sent over the wireless channel, irrespectively of the packet being a data packet.

8. The method according to claim 1, comprising applying said steps iteratively, until an optimum is obtained when the transmission power of the network or node or interface is no longer reduced between iterations.

9. The method according to claim 1, comprising applying said steps wherein the calculated reduced transmitted power is such that all interfaces of all wireless network nodes have the same transmission power, or such that all interfaces of all wireless network nodes have an independent transmission power, or such that all interfaces of each wireless network node have the same transmission power.

10. The method according to claim 1, for a distributed interference aware transmission power control method for wireless network nodes, further comprising the step of the network nodes broadcasting power information exchange packets periodically to exchange power information with neighbor network nodes.

11. The method according to claim 1, wherein the steps are for configuring a software-defined network and/or for planning a wireless network.

12. The method according to claim 11, wherein the wireless network is an IEEE 802.11 wireless network.

13. A device comprising a data processor and data memory, said memory comprising program instructions for implementing an interference aware transmission power control method for wireless network nodes having a directional antenna, the program instructions including instructions executable to carry out the method of claim 1.

14. The device according to claim 13, wherein the directional antenna is selected from the group consisting of: a switched beam antenna, a steerable beam antenna, an adaptive array antenna, and several passive directional antennas connected via a plurality of interfaces.

15. A non-transitory storage media including program instructions for implementing an interference-aware transmission power control method for wireless network nodes having a directional antenna, the program instructions including instructions executable to carry out the method of claim 1.

* * * * *